United States Patent Office 3,578,661
Patented May 11, 1971

3,578,661
PROCESS FOR THE PREPARATION OF 7-[α-(4 - PYRIDYLTHIO)ACETAMIDO]CEPHALO-SPORANIC ACIDS
Robert Edward Havranek, Liverpool, and Leonard Bruce Crast, Jr., Clay, N.Y., assignors to Bristol-Myers Company, New York, N.Y.
No Drawing. Filed June 2, 1969, Ser. No. 829,707
Int. Cl. C07d 99/24
U.S. Cl. 260—243                                            6 Claims

ABSTRACT OF THE DISCLOSURE

7-[α-(4 - pyridylthio)acetamido]cephalosporanic acid and related compounds having the same side chain and the pharmaceutically acceptable salts thereof are valuable antibacterial agents for use in mammals, including man. This disclosure relates to a new process for the preparation of such compounds, an example of which comprises reacting 7-aminocephalosporanic acid with 1-oxo-4-pyridylmercaptoacetyl chloride followed by mild reduction to produce 7 - [α-(4-pyridylthio)acetamido]cephalosporanic acid.

BACKGROUND OF THE INVENTION

(1) Field of the invention

This invention relates to a process for the preparation of 7-[α-(4-pyridylthio)acetamido]cephalosporanic acids; the compounds are useful as antibacterial agents.

(2) Description of the prior art

The cephalosporin literature contains many examples of procedures for the acylation of 7 - aminocephalosporanic acid amongst which are U.S. Pats. 3,079,314; 3,117,126; 3,140,282; 3,322,749; 3,322,750; 3,335,136 and 3,365,449 and British Patents 932,644; 957,570; 959,054 and 1,073,996. The compound 7-[α-(4-pyridylthio)acetamido]cephalosporanic acid is disclosed in U.S. Patent No. 3,422,100.

SUMMARY OF THE INVENTION

The present invention relates to an alternate process for the preparation of compounds having the formula

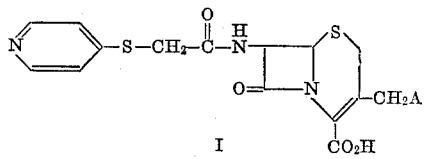

I in which A is hydrogen or acetoxy, and the pharmaceutically acceptable nontoxic salts thereof.

This invention relates to a process for the preparation of synthetic compounds of value as antibacterial agents, as nutritional supplements in animal feeds, as agents for the treatment of mastitis in cattle, and as therapeutic agents in poultry and animals, including man, in the treatment of infectious diseases caused by Gram-positive and Gram-negative bacteria, and more particularly, relates to certain 7 - [α - (4 - pyridylthio)acetamido]cephalosporanic acids, related salts and derivatives thereof.

Antibacterial agents in the past have proven highly effective in the therapy of infections due to either Gram-positive or Gram-negative bacteria but few are effective against both. It was the objective of the present invention to provide an improved process for the preparation of certain compounds effective against both Gram-positive and Gram-negative bacteria including resistant strains.

The objects of the present invention have been achieved by the provision, according to the present invention, of the process for the preparation of the compound having the formula

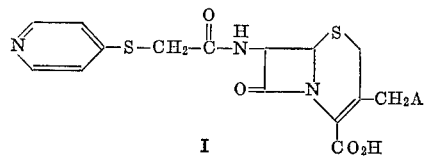

I wherein A is hydrogen or acetoxy; or a pharmaceutically acceptable, nontoxic salt thereof;

which comprises selectively reducing a compound having the formula

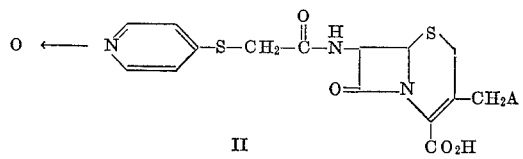

II in which A is hydrogen or acetoxy; or a salt thereof, by catalytic or chemical reduction.

A preferred embodiment is the process for the preparation of the compound having the Formula I which comprises selectively reducing a compound having the Formula II by treatment with a mild reducing agent selected from the group comprising tri(lower)alkyl phosphites, phosphorous trihalides, iron-acetic acid, sulfur, triphenyl phosphite, triphenylphosphine, benzenesulfenyl halide, sulfur monochloride, di-n-butyl sulfide, (lower)alkyl mercaptan, thiourea and hydrazobenzene, and lead with ferrous oxalate; or by the treatment with hydrogen in the presence of a catalyst selected from the group comprising palladium, Raney nickel, platinum oxide, rhodium, ruthenium and nickel.

A more preferred embodiment is the process for the preparation of the compound having the Formula I which comprises selectively reducing a compound having the Formula II by treatment with a mild reducing agent selected from the group comprising tri(lower)alkyl-phosphites and triphenylphosphite; or by treatment with hydrogen in the presence of a catalyst selected from the group comprising nickel, palladium and Raney nickel.

A still more preferred embodiment is the process for the preparation of the compound having the Formula I which comprises selectively reducing a compound having the Formula II by treatment with triethyl phosphite in an organic ether solvent containing some peroxide contamination, at a temperature in the range of about 0° C. to about 60° C. for a period of about 1 to 48 hours.

Another still more preferred embodiment is the process for the preparation of the compound having the Formula I which comprises selectively reducing a compound having the Formula II by treatment with hydrogen in the presence of a catalyst selected from the group comprising palladium on charcoal and Raney nickel at a hydrogen pressure of about 1 to 10 atmospheres at a temperature in the range of about 0° C. to about 60° C. in an inert solvent selected from the group comprising water, a (lower)alkanol, a (lower)alkanoic acid, dioxane tetrahydrofuran, or mixtures thereof.

A most preferred embodiment is the process for the preparation of the compound having the Formula I which comprises selectively reducing a compound having the Formula II by treatment with at least a two molar excess of triethyl phosphite in diethylene glycol diethyl ether containing some peroxide contamination at a temperature in the range of about 10° C. to about 50° C. for a period of about one to forty-eight hours.

Another most preferred embodiment is the process for the preparation of the compound having the Formula I which comprises selectively reducing a compound having the Formula II by treatment with hydrogen in the presence of Raney nickel at a hydrogen pressure of about 1 to 5 atmospheres at a temperature in the range of about 10° C. to about 35° C. in an inert solvent such as water, ethanol, acetic acid, or mixtures thereof.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. "(lower)alkanol," it refers to the alkyl portion of such group which is therefore as described above in connection with "(lower)alkyl" and thus includes such radicals as methanol, ethanol, isopropanol, etc.

The pharamceutically acceptable, nontoxic 4-carboxylic acid salts include such metallic cations as sodium, potassium, calcium and aluminum, and organic amine cations such as triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N-(lower)alkylpiperidines, e.g. N-ethylpiperidine, and other amines which have been used to form salts with benzylpenicillin or cephalosporins.

As the compounds of the present invention are capable of forming salts with acids due to their basic nitrogen functions, the compounds are in a sense amphoteric and include the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, succinate, benzoate, tartrate, fumarate, malate, mandelate, ascrobate and the like.

The starting materials used in the present invention include 7 - aminocephalosporanic acid (7 - ACA) and 3 - methyl-7-aminodecephalosporanic acid. 7-aminocephalosporanic acid is prepared by hydrolysis of cephalosporin C and has the formula

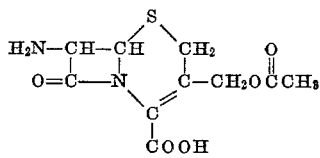

IV 3-methyl-7-aminodecephalosporanic acid having the formula

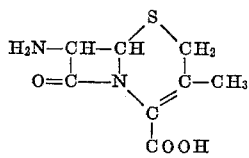

V is produced by catalytic reduction of cephalosporin C followed by hydrolytic removal of the 5-aminoadiopoyl side chain as described in U.S. Pat. No. 3,129,224.

In the process for the preparation of the compounds of the present invention, the compounds can be isolated from the reaction mixture by extraction into water as an acid addition salt at a pH of about 2 and then crystallized by neutralization to the isoelectric point of about pH 3.5. Addition of a water miscible solvent such as acetone sometimes enhances crystallization and further reduces solubility. The acid form can then be converted to any desired metal or amine salt, particularly the pharmaceutically acceptable, nontoxic salts described above, by treatment with the appropriate base, e.g. a free amine such as procaine base or a solution of sodium 2-ethylhexanoate in dry n-butanol.

In the treatment of bacterial infections in man, the compounds prepared by the process of this invention are administered orally or parenterally, in accordance with conventional procedures for antibiotic administration, in an amount of from about 5 to 60 mg./kg./day in divided dosage, e.g., three to four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The compound having the Formula II, e.g.,

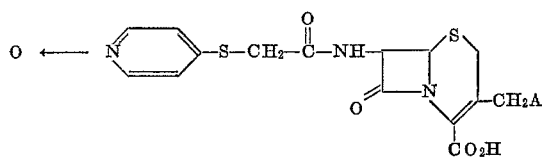

is prepared by the reaction of 4-mercaptopyridine-1-oxide with a compound having the formula

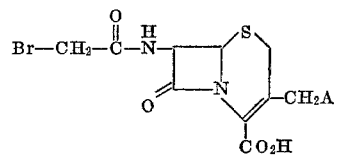

in which A is acetoxy or hydrogen.

The compound 7-[α-(1-oxo-4-pyridylthio)acetamido]-cephalosporanic acid is generically disclosed in Japanese Pat. No. 16,952/66, Fujisawa Yakuhin Kogyo, Inventors: Takano, Haltori, Nakanishi, Miura, Umio and Kishimoto.

When the compounds of the present invention are prepared by mild reduction via the use of a phosphite, it is preferred to use an ether solvent such as diethylene glycol diethyl ether, diethyl ether, dibutyl ether, dioxane, tetrahydrofuran or the like. It is also preferred that the ether used contain some solvent peroxide contaminants and be exposed to the air during the reduction reaction time. The exact reason for the desirability of the presence of solvent peroxides is not known, but is thought the reduction mechanism is peroxide catalyzed, i.e., a free radical mechanism. The presence of oxygen (air) and ultraviolet light likewise seems to help.

Because of the heat lability of penicillins in solution, it is preferred to conduct the reduction below 60° C. However, the solution may be warmed to above 60° C. for a limited period of time to facilitate solution and completeness of the reaction in a shorter period of time, i.e. one to two hours.

Ref.: T. R. Emerson and C. W. Rees, Proc. Chem. Soc., 1960, pp. 418–419.

Other agents are known in the art for reducing pyridine-N-oxides to pyridines. They include phosphorus trihalides [M. Hamana, Yakugaku Zasshi, 75, 123 (1950)], iron-acetic acid [H. J. den Hertog and J. Anerhoff, Rec. trav. Chim., 69, 468 (1950)], sulfur [K. Takeda and K. Tokuyama, J. Pharm. Soc. Japan, 75, 260 (1955)], triphenylphosphine [E. Howard, Jr., and W. F. Olszewski, J. Am. Chem. Soc., 81, 1483 (1959)], benzenesulfenyl halides, sulfur monochloride [S. Furukawa, Pharm. Bull. (Japan), 3, 230 (1955)], di-n-butylsulfide [N. Grabowsky, Ann., 175, 348 (1875)], (lower)alkyl mercaptans, thiourea, hydrazobenzene [D. Relyea, P. Tawney and A. Williams, J. Org. Chem., 477 (1962)], and lead with ferrous oxalate [R. A. Abramovitch and K. Adams, Canadian J. Chem., 39, 2134 (1961)].

The following examples will serve to illustrate this invention without limiting it thereof.

All temperatures are given in degrees centigrade.

In the examples below, 7-ACA represents the compound having the formula

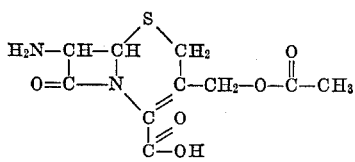

Likewise in the examples that follow, "MIC" represents the Minimum Inhibitory Concentration in mcg./ml. of the compound required to inhibit the growth of the test organism described.

DESCRIPTION OF THE PREFERRED EMBODIMENTS

EXAMPLE 1

(A) Preparation of 4-mercaptopyridine-1-oxide (4-mercaptopyridine-N-oxide)

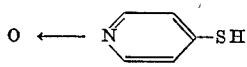

A stirred slurry of 7.61 grams (0.1 mole) of thiourea and 12.95 grams (0.1 mole) of 4-chloropyridine-N-oxide in fifty ml. of ethanol was heated to reflux until precipitation began (approximately one hour). The slurry was allowed to cool and the isothiuronium salt filtered off, washed with ethanol and air dried. The salt was then suspended in 100 ml. of water and 50% sodium hydroxide added dropwise until pH 11 was obtained. After stirring the resulting solution one hour, the pH was adjusted to 2.5 with 6 N HCl and the 4-mercapto-pyridine-1-oxide allowed to crystallize in an ice bath for one hour. The product was then filtered off, washed with cold water and air dried to give 8.9 grams, M.P. 140° C.

Reference: J. Org. Chem., 18, 534 (1953).

(B) Preparation of 7-[α-(1-oxo-4-pyridylthio)acetamido] cephalosporanic acid

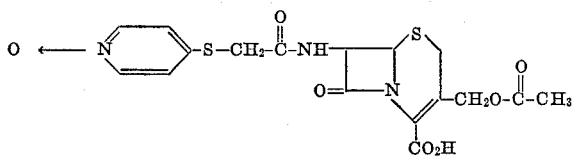

To a stirred solution of 4.15 grams (0.01 mole) of sodium bromomethylcephalosporin, 0.84 gram (0.01 mole) of sodium bicarbonate in 25 ml. of water was added 1.27 grams (0.01 mole) of 4-mercaptopyridine-1-oxide and stirring continued for three hours. Twenty-five ml. of ethyl acetate was added and the pH adjusted to 2.5 with 40% $H_3PO_4$ whereupon the product crystallized out. The product was filtered off, washed with ethyl acetate and water and air dried. The yield was 2.10 grams, decomposition point—approximately 180° C. The infrared spectrum (IR) and nuclear magnetic resonance spectrum (NMR) were consistent with the structure.

Analysis.—Calc'd for $C_{17}H_{17}N_3O_7S_2$ (percent): C, 46.36; H, 3.86; N, 9.54. Found (percent): C, 46.39; H, 4.11; N, 9.78.

EXAMPLE 2

(A) Preparation of sodium - 7 - [α - (4-pyridylthio)acetamido]cephalosporanate via catalytic reduction with Raney nickel

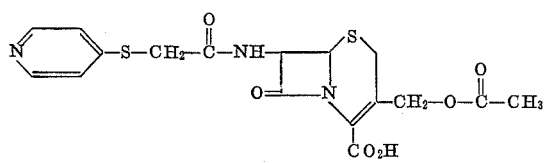

Eight grams (0.018 mole) of 7-[α-(1-oxo-4-pyridylthio)acetamido]cephalosporanic acid was dissolved in 100 ml. of $H_2O$ by adding 1.68 grams (0.02 mole) of $NaHCO_3$ with stirring. Approximately three grams of commercial (wet) Raney Ni was added, followed by a few drops of glacial acetic acid and the mixture hydrogenated on the Parr apparatus at 50 p.s.i. initial pressure for one hour. About 6 lbs. of $H_2$ were taken up or about ⅓ of theory. The catalyst was filtered off and replaced by three grams of fresh catalyst. The hydrogenation was continued as before for three hours. Another six lbs. were taken up still leaving about six lbs. remaining. However, the catalyst was filtered off, the pH of the filtrate adjusted to 3 and the filtrate concentrated under reduced pressure at 20° C. to a powder. The powder was bioassayed and was found to contain at least 50% by weight of the above title compound, sodium 7 - [α - (4-pyridylthio)acetamido]cephalosporanate.

(B) Separation and purification of 7-[α-(4-pyridylthio) acetamido]cephalosporanic acid The mixture of the sodium 7-[α-(4-pyridylthio)acetamido]cephalosporanate and sodium 7-[α-(1-oxo-4-pyridylthio)acetamido]cephalosporanate obtained above was dissolved in 200 ml. of water and acidified with 1 N hydrochloric acid to pH 1–2. A few crystals of the N-oxide were added and the oily particles were induced to crystallize by the addition of a small quantity of ethyl acetate and scratching with a glass rod. The two phase mixture was filtered to remove the solid crystalline 7-[α-(1-oxo-4-pyridylthio)acetamido]cephalosporanic acid. The aqueous phase was collected and extracted two times with twenty-five ml. portions of ethyl acetate. The aqueous phase was neutralized with triethylamine to pH 5 and seeded with crystals of 7-[α-(4-pyridylthio) acetamido] cephalosporanic acid. Cooling for two to three hours produced pure crystals of the desired title product. The NMR and IR were consistent with the structure of the desired product and identical to that of authentic material as prepared in U.S. Pat. 3,422,100.

M.I.C. vs. *Diplococcus pneumoniae* plus 5% serum (dissolved in dilute aqueous sodium bicarbonate) was 0.062 mcg./ml., vs. *Streptococcus pyogenes* A9604 was 0.016 mcg./ml., vs. *Staphylococcus aureus* Smith was 0.125 mcg./ml., vs. *Staphylococcus aureus* Smith plus 50% serum was 0.2 mcg./ml., vs. *Staphylococcus aureus* BX 1633–2 (benzylpenicillin resistant) was 0.2 mcg./ml., vs *Salmonella enteritidis* A9531 was 0.4 mcg./ml. and vs. *Klebsiella pneumoniae* A9997 was 3.2 mcg./ml.

These tests were conducted in Baltimore Biological Laboratories Antibiotic Assay Broth.

EXAMPLE 3

Preparation of sodium 7-[α-(4-pyridylthio) acetamido]cephalosporanate

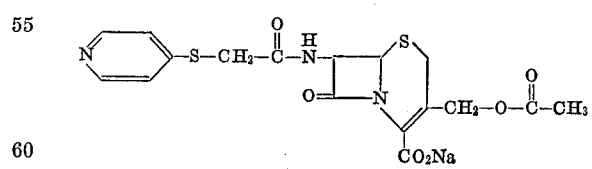

Five liters of methylene chloride were added to a clean dry vessel equipped with stirrer. 7-[α-(4-pyridylthio)acetamido]cephalosporanic acid (1000 grams) was added to the vessel, followed by 350 ml. of triethylamine. The resultant solution was treated with decolorizing charcoal for fifteen minutes and filtered. A solution of sodium-2-ethylhexanoate (27.3%) in butanol-methylene chloride was added to the filtrate with stirring. 7500 ml. of acetone was added. Crystallization occurred while stirring was continued several hours under dry conditions. The crystals were collected by filtration, washed with large volumes of acetone, and then dried in vacuo at 50° C. to yield about 950 grams of the title compound.

EXAMPLE 4

Preparation of 7-[α-(4-pyridylthio)acetamido]cephalosporanic acid via other metal catalysts:

Substitution in the procedure of Example 3 for the Raney nickel used therein of a metal catalyst selected from the group comprising palladium, platinum, rhodium, nickel and ruthenium produces 7-[α-(4-pyridylthio)acetamido]cephalosporanic acid from 7-[α-(1-oxo-4-pyridylthio)acetamido]cephalosporanic acid.

EXAMPLE 5

Preparation of 7-[α-(4-pyridylthio)acetamido]cephalosporanic acid via the use of triethyl phosphite:

Eight grams (0.018 mole) of 7-[α-(1-oxo-4-pyridylthio)acetamido]cephalosporanic acid is dissolved with warming in 250 ml. of "old"[1] diethylene glycol diethyl ether. The solution is chilled rapidly and at least a 3 molar equivalent excess of triethyl phosphite is added. The solution is stirred at room temperature for about 48 hours following which the ether solution is treated with dry HCl gas. The product, 7-[α-(4-pyridylthio)acetamido]cepaholsporanate precipitates as the hydrochloride and is collected by filtration. The hydrochloride is placed in about 100 ml. of water and neutralized to about pH 5 with triethylamine. The resultant solid is collected and is determined to be 7-[α-(4-pyridylthio)acetamido]cephalosporanic acid.

EXAMPLE 6

Substitution in the procedure of Example 5 for the triethyl phosphite used therein of triphenyl phosphite produces 7 - [α - (4 - pyridylthio)acetamido]cephalosporanic acid.

EXAMPLE 7

Substitution in the procedure of Example 5 for the ethylene glycol diethyl ether used therein of another ether, i.e. dioxane, tetrahydrofuran, dibutyl ether, diethyl ether, or the like, preferably containing some solvent peroxides, produces the product 7-[α-(4-pyridylthio)acetamido]cephalosporanic acid.

---

[1] Old diethylene glycol diethyl ether is preferred since it contains some solvent peroxides which appear to catalyze the reaction.

We claim:
1. The process for the preparation of the compound having the formula

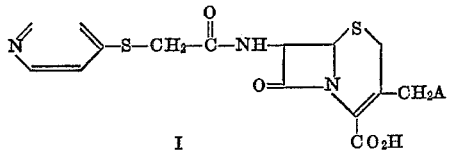

in which A is hydrogen or acetoxy;
or a pharmaceutically acceptable, nontoxic salt thereof;
which comprises selectively reducing a compound having the formula

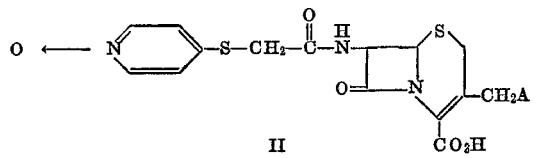

in which A is hydrogen or acetoxy; or a salt thereof;
by treatment with a mild reducing agent selected from the group comprising tri(lower)alkyl phosphites, phosphorous trihalides, iron-acetic acid, sulfur, triphenyl phosphite, triphenyl phosphine, benzenesulfenyl halides, sulfur monohalides, di-n-butylsulfides, (lower)alkyl mercaptans, thiourea, hydrazobenzene and lead with ferrous oxalate;
or by treatment with hydrogen in the presence of a catalyst selected from the group comprising palladium, nickel, Raney nickel, platinum, rhodium and ruthenium.

2. The process of claim 1 which comprises selectively reducing a compound having the Formula II by treatment with a mild reducing agent selected from the group comprising a tri(lower)alkyl phosphite and triphenyl phosphite; or by treatment with hydrogen in the presence of a catalyst selected from the group comprising nickel, palladium and Raney nickel.

3. The process of claim 1 which comprises selectively reducing a compound having the Formula II
by treatment with triethyl phosphite
in an organic ether solvent containing some peroxide contamination,
at a temperature in the range of about 0° C. to about 60° C.
for a period of about one to forthy-eight hours.

4. The process of claim 1 which comprises selectively reducing a compound having the Formula II
by treatment with at least a two molar excess of triethyl phosphite
in diethylene glycol diethyl ether which is contaminated by solvent peroxide
at a temperature in the range of about 10° C. to about 50° C.
for a period of about one to forty-eight hours.

5. The process of claim 1 which comprises selectively reducing a compound having the Formula II by treatment with hydrogen in the presence of a catalyst selected from the group comprising palladium on charcoal and Raney nickel at a hydrogen pressure of about 1 to about 10 atmospheres
at a temperature in the range of about 0° C. to about 60° C.
in an inert solvent selected from the group comprising water, a (lower)alkanol, a (lower)alkanoic acid, dioxane, tetrahydrofuran, or mixtures thereof.

6. The process of claim 1 which comprises selectively reducing a compound having the Formula II
by treatment with hydrogen in the presence of Raney nickel
at a hydrogen pressure of about 1 to 5 atmospheres
at a temperature in the range of about 10° C. to about 35° C.
in an inert solvent selected from the group comprising water, methanol, ethanol, propanol, isopropanol, acetic acid, or mixtures thereof.

References Cited

UNITED STATES PATENTS 3,422,100   1/1969   Crast _____ 260—243

NICHOLAS S. RIZZO, Primary Examiner

U.S. Cl. X.R.

424—271

PO-1050
(5/69)

UNITED STATES PATENT OFFICE
CERTIFICATE OF CORRECTION

Patent No. 3,578,661          Dated May 11, 1971

Inventor(s) Robert Edward Havranek and Leonard Bruce Crast, Jr.

It is certified that error appears in the above-identified patent and that said Letters Patent are hereby corrected as shown below:

The first formula of claim 1 should read as follows:

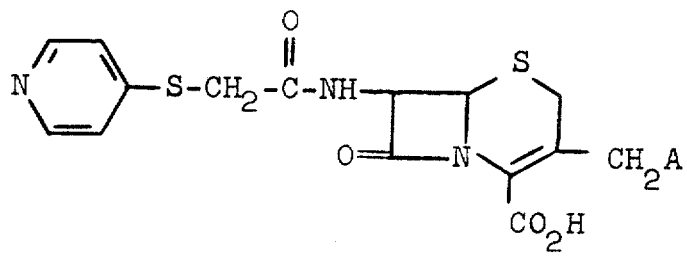

(column 7, lines 47-54).

Line 6 of column 8 should read---monohalides, di-n-butyl-sulfide, (lower)alkyl mercaptans,---.

Signed and sealed this 15th day of February 1972.

(SEAL)
Attest:

EDWARD M. FLETCHER, JR.
Attesting Officer

ROBERT GOTTSCHALK
Commissioner of Patents